(12) United States Patent
Kojima et al.

(10) Patent No.: US 6,181,854 B1
(45) Date of Patent: Jan. 30, 2001

(54) OPTICAL MODULE PACKAGED WITH MOLDED RESIN

(75) Inventors: Takashi Kojima, Sapporo; Naoki Yamamoto, Kawasaki; Hironao Hakogi, Kawasaki; Yoshio Shimano, Kawasaki; Kazunori Miura, Kawasaki, all of (JP)

(73) Assignee: Fujitsu Limited, Kawasaki (JP)

( * ) Notice: Under 35 U.S.C. 154(b), the term of this patent shall be extended for 0 days.

(21) Appl. No.: 09/352,356

(22) Filed: Jul. 13, 1999

(30) Foreign Application Priority Data

Sep. 18, 1998 (JP) .................................................. 10-264175

(51) Int. Cl.[7] ...................................................... G02B 6/36
(52) U.S. Cl. .................................. 385/49; 385/83; 385/94
(58) Field of Search ................................. 385/88–94, 49, 385/83

(56) References Cited

U.S. PATENT DOCUMENTS

| 6,019,523 | * | 2/2000 | Honmou | 385/94 |
| 6,075,911 | * | 6/2000 | Goto | 385/31 |

FOREIGN PATENT DOCUMENTS

| 63-5310 | 1/1988 | (JP) . |
| 3-16109 | 2/1991 | (JP) . |
| 5-243444 | 9/1993 | (JP) . |
| 5-243445 | 9/1993 | (JP) . |
| 5-245853 | 9/1993 | (JP) . |
| 6-069604 | 3/1994 | (JP) . |
| 8-122588 | 5/1996 | (JP) . |
| 9-105839 | 4/1997 | (JP) . |

* cited by examiner

Primary Examiner—Hung N. Ngo
(74) Attorney, Agent, or Firm—Staas & Halsey LLP

(57) ABSTRACT

An optical module including a plurality of leads, a substrate having a first groove and a plurality of conductor patterns electrically connected to the leads, a ferrule having a center hole in which an optical fiber is inserted and fixed, the ferrule being mounted in the first groove of the substrate so that one end of the ferrule projects from an end surface of the substrate, and an optical element mounted on the substrate for making conversion between light and electricity. The optical module further includes a transparent first resin for covering at least the optical element and the other end of the ferrule, and a second resin for enclosing all of the leads, the substrate, the ferrule, the optical element, and the first resin except the one end of the ferrule and a part of each of the leads.

6 Claims, 14 Drawing Sheets

OPTICAL MODULE PACKAGED WITH MOLDED RESIN

BACKGROUND OF THE INVENTION

1. Field of the Invention

The present invention relates to an optical module and a manufacturing method therefor.

2. Description of the Related Art

In recent years, the development of an optical access network has been actively carried out. For realization of the optical access network, reducing the cost of an optical device and/or an optical module is a very important subject. Further, in encapsulating an optical element for making conversion from light to electricity or conversion from electricity to light, a further cost reduction is necessary, and it is required to realize an optical module which can simply encapsulate the optical element and can ensure a sufficient reliability.

In many optical modules at present, a metal package or a ceramic package is used to ensure reliability, and the package is hermetically sealed by welding or soldering, so that the cost of each optical module becomes very high. It is therefore an important subject for the cost reduction of an optical module to simplify an encapsulation method for an optical element. As an example of a method of simply hermetically sealing an optical module, there has been proposed a method including the steps of applying a resin to the entire surface of a substrate on which an optical element is mounted, and next curing the resin to hermetically seal the optical element (Mitsuo Fukuda et al., "Plastic Packaging of Semiconductor Laser Diode", Electronic Components and Conference, 1996, pp 1101–1108).

An optical module such as a light emitting module or a photodetecting module is required to be connected to an optical connector, so as to launch an optical signal to an optical fiber transmission line or to receive an optical signal from an optical fiber transmission line, and it is accordingly necessary to realize an optical module allowing the connection to the optical connector with a simple structure. However, in the case that a resin is applied to the entire surface of a substrate on which an optical element is mounted, and the resin is next cured to hermetically seal the optical element as described in the above literature, there is a possibility of separation of the resin from the substrate or generation of cracks or the like in the resin due to a difference in coefficient of linear expansion between the substrate and the resin. Furthermore, the substrate may be broken by a residual stress in the resin.

SUMMARY OF THE INVENTION

It is therefore an object of the present invention to provide a low-cost, high-reliability optical module which can be easily connected to an optical fiber transmission line.

In accordance with an aspect of the present invention, there is provided an optical module comprising a plurality of leads; a substrate having a first groove and a plurality of conductor patterns electrically connected to the leads; a ferrule having a center hole in which an optical fiber is inserted and fixed, a first end, and a second end, the ferrule being mounted in the first groove of the substrate so that the first end projects from an end surface of the substrate; an optical element mounted on the substrate for making conversion between light and electricity; a first resin for covering at least the optical element and the second end of the ferrule, the first resin having transparency to the light; and a second resin for enclosing all of the leads, the substrate, the ferrule, the optical element, and the first resin except the first end of the ferrule and a part of each of the leads.

Preferably, the optical module further comprises a block having a second groove, the block being fixed to the substrate so that the second groove holds the ferrule. In this optical module, each of the first groove and the second groove preferably has a trapezoidal cross section.

In the optical module according to the present invention, an optical coupling portion between the optical element and the second end of the ferrule is covered with the transparent first resin, so that the optical fiber in the ferrule and the optical element can be optically coupled together through the transparent first resin, thus configuring the optical coupling portion without a space. All of the components except the first end of the ferrule and a part of each of the leads are enclosed by the second resin molded, thereby firmly fixing the ferrule to the substrate. Accordingly, it is possible to provide a receptacle type optical module having a sufficient strength against an external force applied to the optical module in connecting or disconnecting an optical connector with respect to the optical module while employing a resin sealed structure superior in productivity. Since the optical module according to the present invention is sealed with resin, greatly stable characteristics can be exhibited against environmental changes such as temperature changes or humidity changes.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
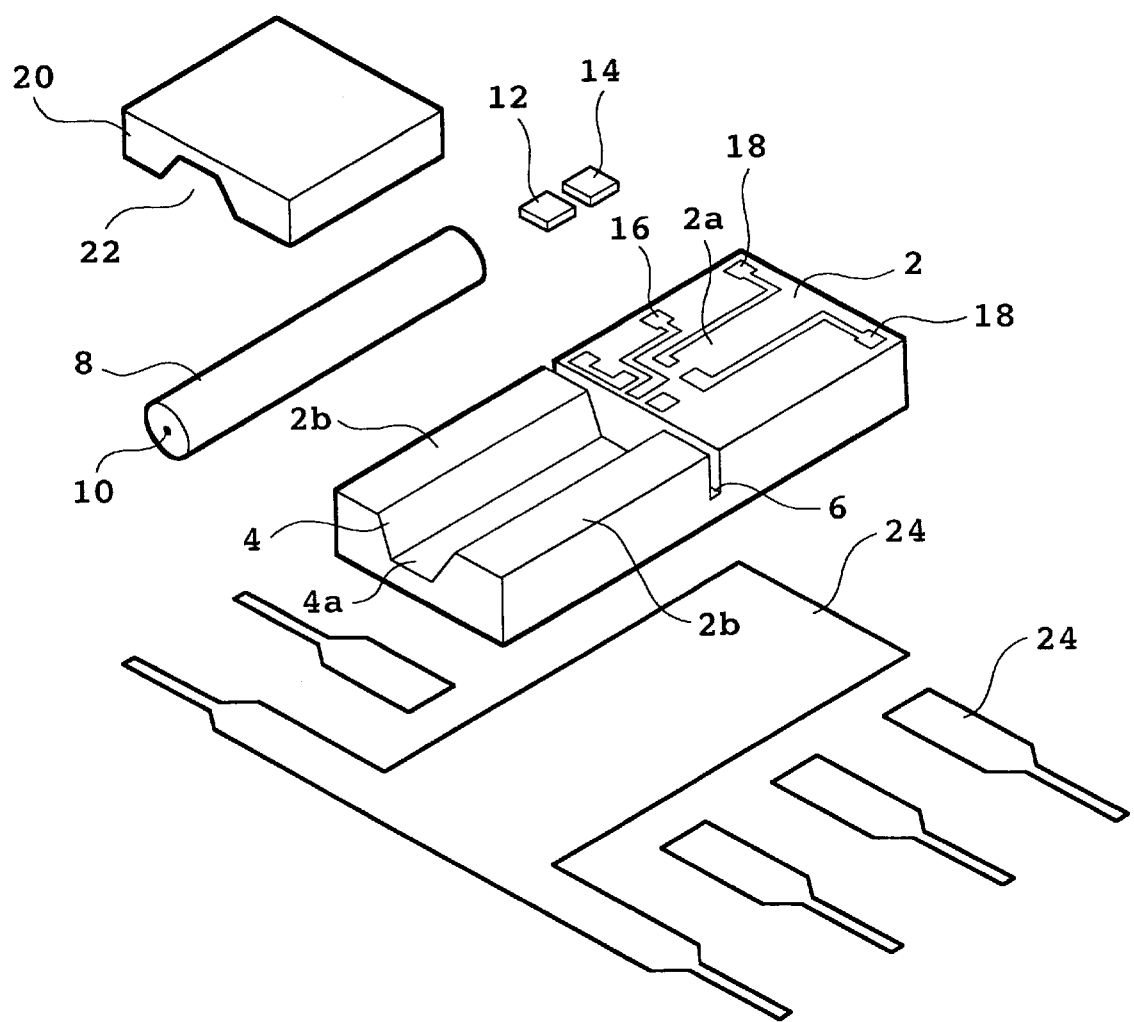
FIG. 1 is an exploded perspective view showing a ferrule fixing structure according to a first preferred embodiment of the present invention.

A ferrule fixing structure and a structure of an optical coupling portion according to a first preferred embodiment of the present invention will now be described with reference to FIGS. 1 and 2. Reference numeral 2 denotes a substrate formed of silicon (Si), for example. The substrate 2 has a size of 3 mm wide and 8 mm long, for example. While the silicon substrate 2 is used in this preferred embodiment by way of example, any other substrates such as a semiconductor substrate, ceramic substrate, and glass substrate may be adopted. The substrate 2 is formed with a groove 4 having a trapezoidal cross section. The groove 4 is formed by anisotropic etching of the upper surface of the substrate 2, and extends in the longitudinal direction of the substrate 2 between one end of the substrate 2 and the middle thereof. The substrate 2 is further formed with a groove 6 having a rectangular cross section. The groove 6 is formed by cutting of the upper surface of the substrate 2 at one end of the groove 4 by using a dicing saw, and extends in the transverse direction of the substrate 2 over the width thereof in perpendicular relationship to the groove 4. The depth of the groove 4 is set to about 650 μm in consideration of a typical design such that a cylindrical ferrule 8 having an outer diameter of 1.25 mm is mounted in the groove 4 of the substrate 2.

The cylindrical ferrule 8 is formed of zirconia, for example, and has an axially extending center hole in which an optical fiber 10 is inserted and fixed. The ferrule 8 may be formed of ceramic (e.g., alumina) or metal. The ferrule 8 has opposite end faces polished to be flush with the opposite end faces of the optical fiber 10. An element mounting portion 2a is formed in an area of the upper surface of the substrate 2 between the other end of the substrate 2 and the groove 6. An electro-optic conversion element 12 such as a laser diode and an opto-electric conversion element 14 such as a photodiode for monitoring are mounted on the element mounting portion 2a of the substrate 2. Further, a pair of conductor patterns 16 for the electro-optic conversion element 12 and a pair of conductor patterns 18 for the opto-electric conversion element 14 are formed on the element mounting portion 2a of the substrate 2.

In fixing the ferrule 8 to the substrate 2, a thermosetting adhesive in a liquid state is first dropped onto a bottom surface 4a of the groove 4 and a pair of bonding surfaces 2b of the substrate 2 formed on the opposite sides of the groove 4, and the ferrule 8 is next mounted into the groove 4 so that the front end face of the ferrule 8 abuts against a vertical surface of the substrate 2 defining the groove 6, thereby positioning the ferrule 8 in the groove 4. Then, the thermosetting adhesive is dropped also onto an upper portion of the ferrule 8 mounted in the groove 4, and a block 20 having a groove 22 similar in sectional shape to the groove 4 is mounted on the substrate 2 so as to press the ferrule 8. Accordingly, the upper portion of the ferrule 8 is held by the groove 22 of the block 20. In this condition, the thermosetting adhesive is cured by heating. As a result, the ferrule 8 is fixed by the cured adhesive in the groove 4 of the substrate 2 and in the groove 22 of the block 20 in such a manner that the substrate 2 and the block 20 are fixed together by the cured adhesive.

Figure 2:
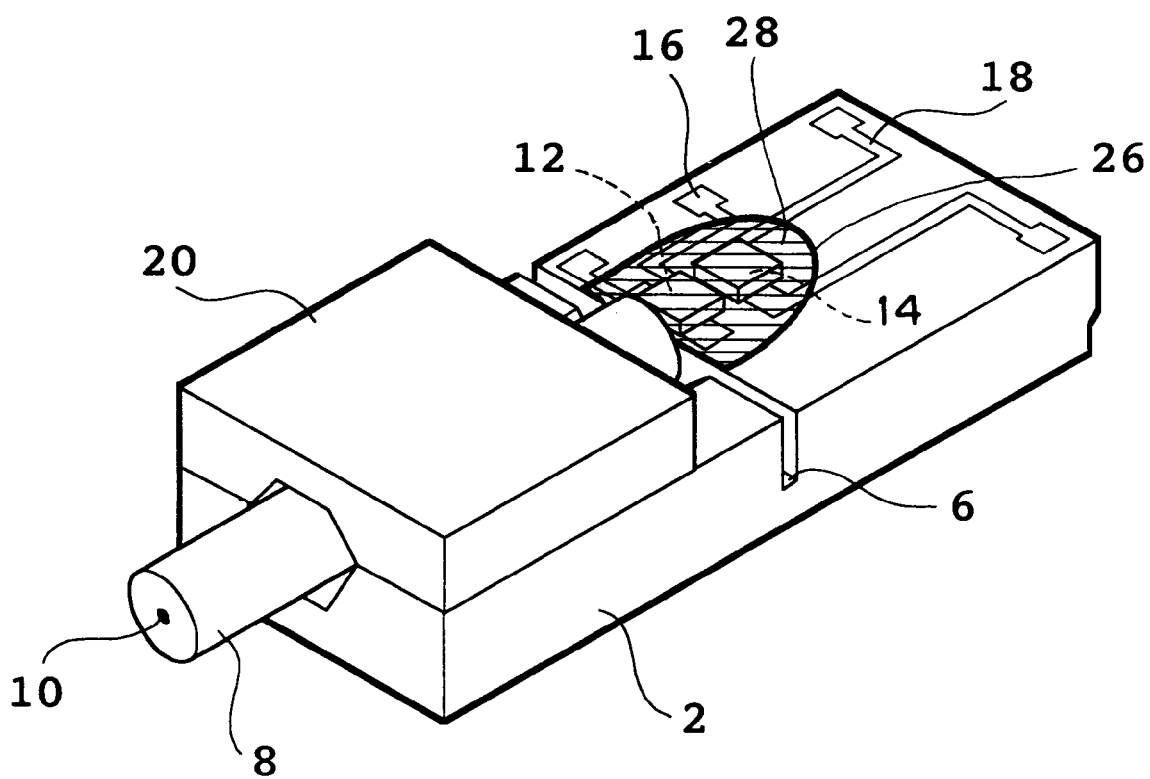
FIG. 2 is a perspective view showing an optical coupling portion in the first preferred embodiment.

As shown in FIG. 2, resin sealing of an optical coupling portion between the electro-optic conversion element 12 and the optical fiber 10 is effected by first applying a dam material (a highly viscous resin) 26 for preventing a liquid sealing resin from flowing away to the surrounding of the optical coupling portion, next applying a thermosetting transparent resin 28 such as a silicone resin to the optical coupling portion, and finally curing the resin 28 by heating. The thermosetting transparent resin 28 may be selected from any resins having a transparency of 90% or more to light having wavelengths in a 1.55 μm band, such as a silicone resin, polyimide resin, and epoxy resin. While a silicone resin is used as the thermosetting transparent resin 28 in each preferred embodiment, any one of the other thermosetting transparent resins satisfying the above condition may be used.

Figure 3:
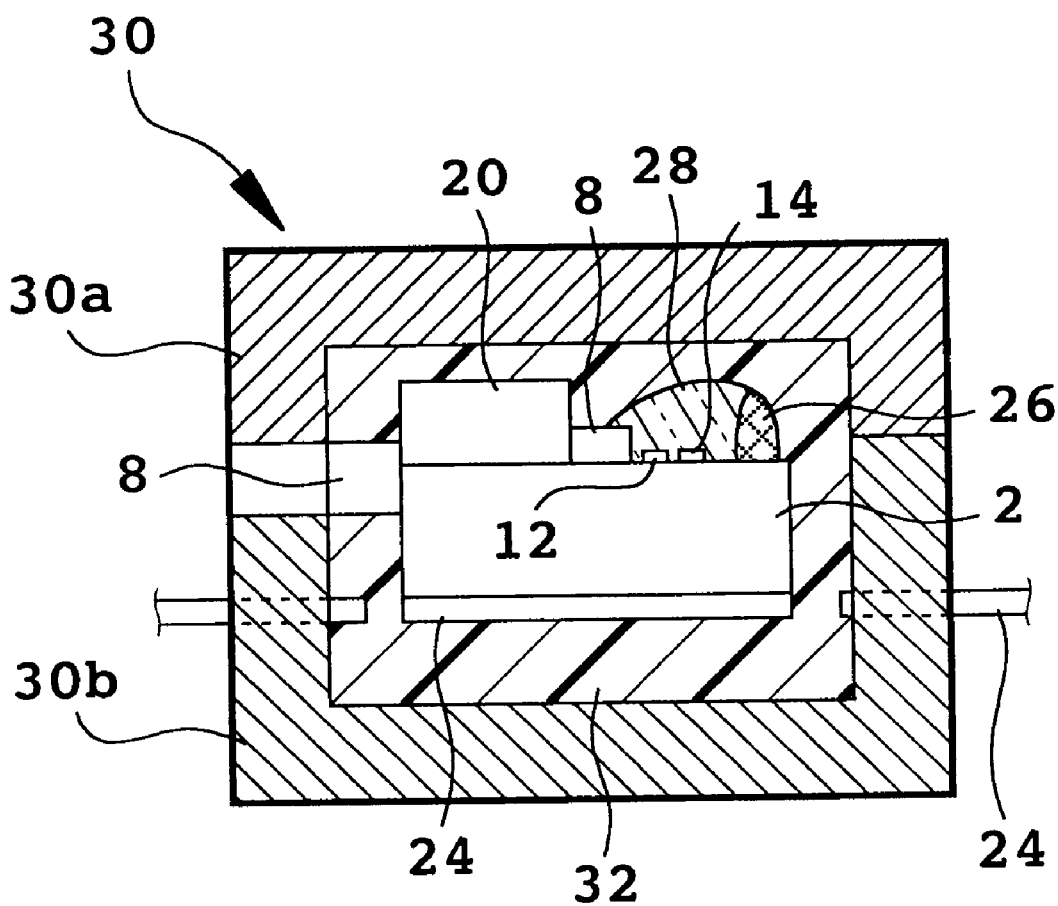
FIG. 3 is a schematic sectional view for illustrating a resin molding process for an optical module in the first preferred embodiment.

Thereafter, the substrate 2 is fixed to a lead frame 24, and all of the lead frame 24, the substrate 2, the ferrule 8, the optical elements 12 and 14, the block 20, and the cured transparent resin 28 except one end portion of the ferrule 8 and a part of the lead frame 24 are fully enclosed by a molded resin 32 (see FIG. 3). The molded resin 32 may be selected from an epoxy resin, phenol resin, PPS (polyphenyl sulfide), etc. While an epoxy resin is used as the molded resin 32 in each preferred embodiment, any one of the other moldable resins may be used.

FIG. 3 is a schematic sectional view for illustrating a resin molding process for the optical module in this preferred embodiment. In the first step, a mold 30 composed of an upper member 30a and a lower member 30b is set in such a manner that the upper member 30a and the lower member 30b are clamped together so as to hold the ferrule 8. At this time, it is preferable to preliminarily apply a releasing agent to the inner surface of the mold 30. In this condition, the epoxy resin 32 in a liquid state is injected from an injection hole (not shown) into the mold 30 by a transfer molding method or an injection molding method. After filling the mold 30 with the epoxy resin 32, the epoxy resin 32 is heated to about 150° C. to about 160° C. for curing. After the epoxy resin 32 is completely cured, the mold 30 is released. Finally, the lead frame 24 is cut to obtain separate leads, thus completing the optical module.

Figure 4:
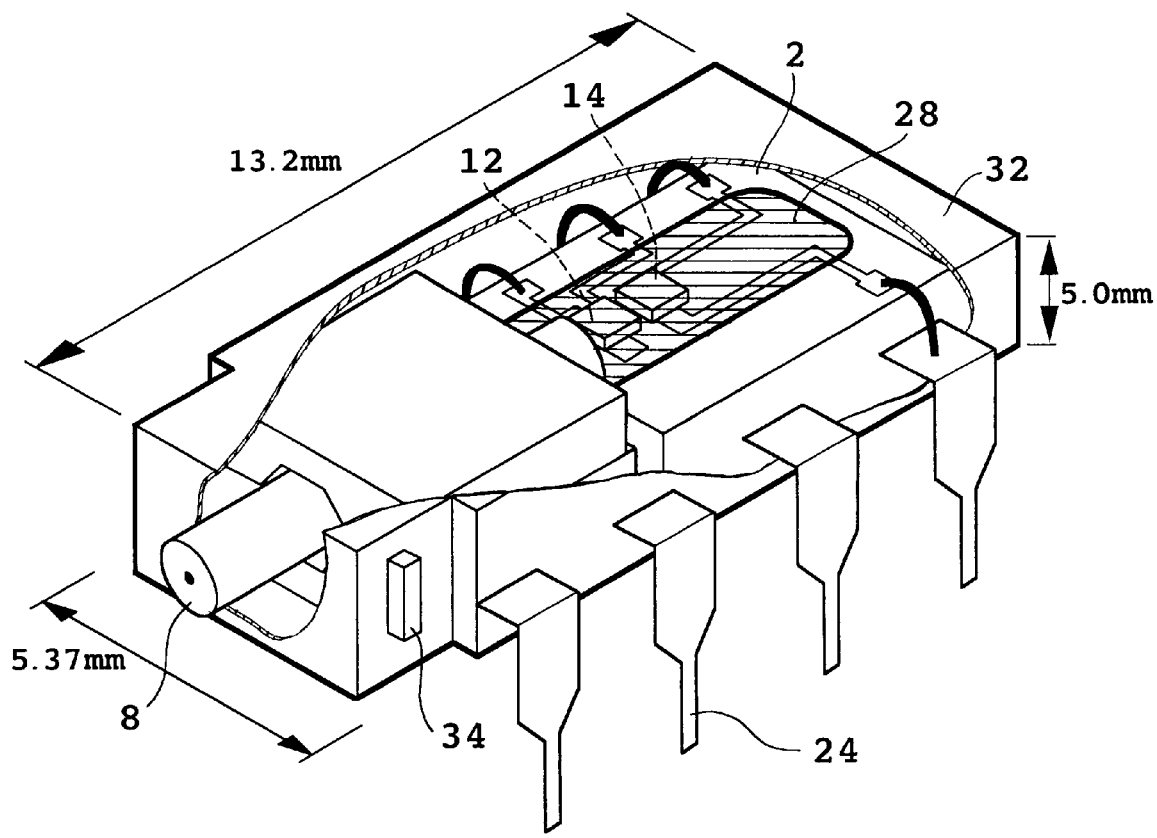
FIG. 4 is a partially cutaway, perspective view of the optical module in the first preferred embodiment.

Referring to FIG. 4, there is shown a partially cutaway, perspective view of the optical module manufactured above according to this preferred embodiment of the present invention. The molded resin 32 includes a wide portion 32a and a narrow portion 32b having a width smaller than that of the wide portion 32a. The ferrule 8 projects from the narrow portion 32b, and the substrate 2 is embedded in the wide portion 32a. The narrow portion 32b is integrally formed with a pair of projections 34 (one of which is not shown) for engaging a pair of recesses of an optical connector (not shown). Thus, the optical module in this preferred embodiment is a receptacle type optical module adapted to be engaged with an optical connector. Alternatively, the pair of projections 34 may be replaced by a pair of recesses for engaging a pair of projections of another optical connector (not shown). The optical module shown in FIG. 4 has a typical size of 13.2 mm long, 5.37 mm wide, and 5.0 mm thick. With this optical module, a connection/disconnection test was made 50 times on a simplified connector, and it was confirmed that an optical coupling loss of ±0.2 dB or less can be obtained.

Figure 5A:
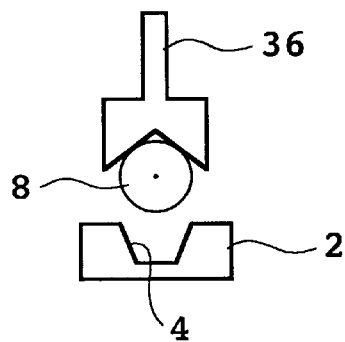
FIGS. 5A to 5C are schematic end views showing a ferrule fixing process in the first preferred embodiment.
Figure 5B:
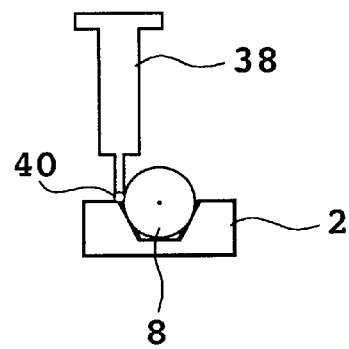
Figure 5C:
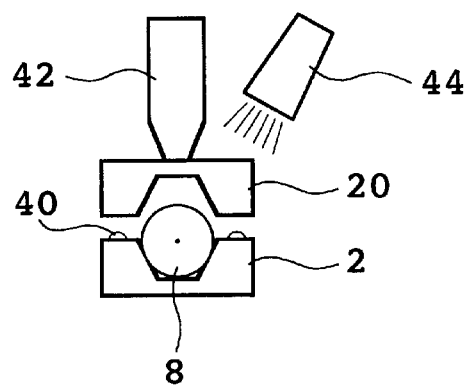

A fixing process for the ferrule 8 will now be described with reference to FIGS. 5A to 5C. As shown in FIG. 5A, the ferrule 8 is mounted into the groove 4 of the substrate 2 and positioned therein by using a collet 36. As shown in FIG. 5B, a thermosetting adhesive 40 in a liquid state is dropped onto the upper surface of the substrate 2 by using a dispenser 38. As shown in FIG. 5C, the block 20 is pressed onto the upper surface of the substrate 2 by using a pressure member 42 in such a manner as to cover the ferrule 8, and the thermosetting adhesive 40 is heated by using a heater 44 for curing, thereby bonding the block 20 to the substrate 2 to fix the ferrule 8 to the substrate 2. The thermosetting adhesive 40 may be replaced by a UV curing adhesive. In the case of using a UV curing adhesive, the block 20 must be formed of a material capable of transmitting ultraviolet rays, such as glass.

Figure 6A:
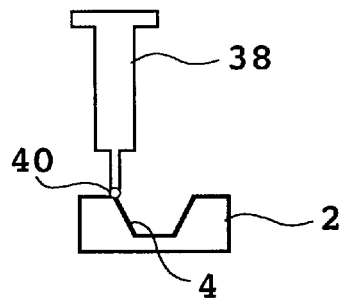
FIGS. 6A to 6C are schematic end views showing another ferrule fixing process in the first preferred embodiment.
Figure 6B:
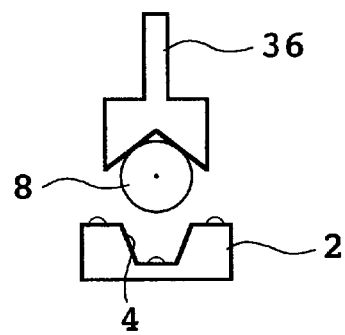
Figure 6C:
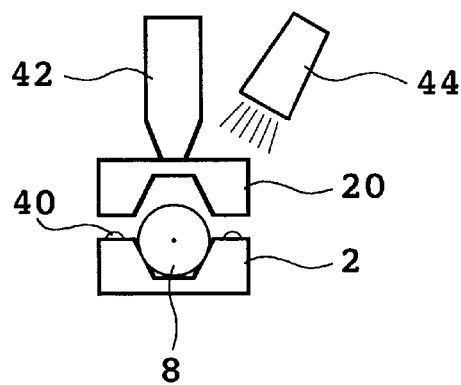

FIGS. 6A to 6C show another fixing process for the ferrule 8. As shown in FIG. 6A, a thermosetting adhesive 40 in a liquid state is dropped onto both the upper surface of the substrate 2 and the bottom surface of the groove 4 by using a dispenser 38. AS shown in FIG. 6B, the ferrule 8 is mounted into the groove 4 of the substrate 2 and positioned therein by using a collet 36. As shown in FIG. 6C, the block 20 is pressed onto the upper surface of the substrate 2 by using a pressure member 42 in such a manner as to cover the ferrule 8, and the thermosetting adhesive 40 is heated by using a heater 44 for curing, thereby bonding the ferrule 8 and the block 20 to the substrate 2. The thermosetting adhesive 40 may be replaced by a UV curing adhesive.

Figure 7:
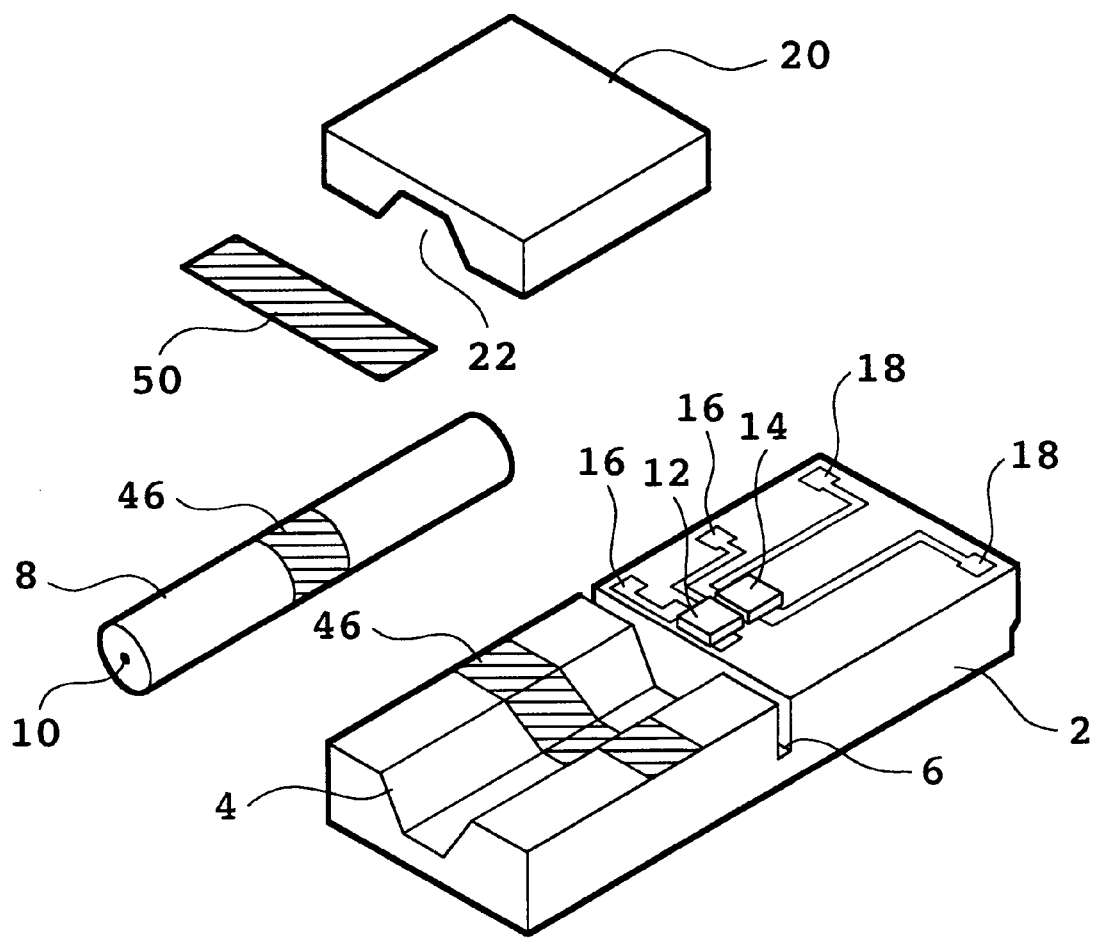
FIG. 7 is an exploded perspective view showing a ferrule fixing method using a solder.

FIG. 7 shows still another fixing method for the ferrule 8 by using a solder rather than an adhesive. Metal films 46 are formed on the upper surface of the substrate 2 including the inside surface of the groove 4, the outer circumference of the ferrule 8, and the lower surface of the block 20 including the inside surface of the groove 22 (the metal film 46 on the lower surface of the block 20 is not shown). A solder sheet 50 is placed between the metal films 46 on the substrate 2 and the block 20, and is heated to be melted, thereby fixing the ferrule 8 and the block 20 to the substrate 2. Although not shown, the conductor patterns 16 and 18 are connected through a plurality of wires to the separate leads of the lead frame 24.

Figure 8:
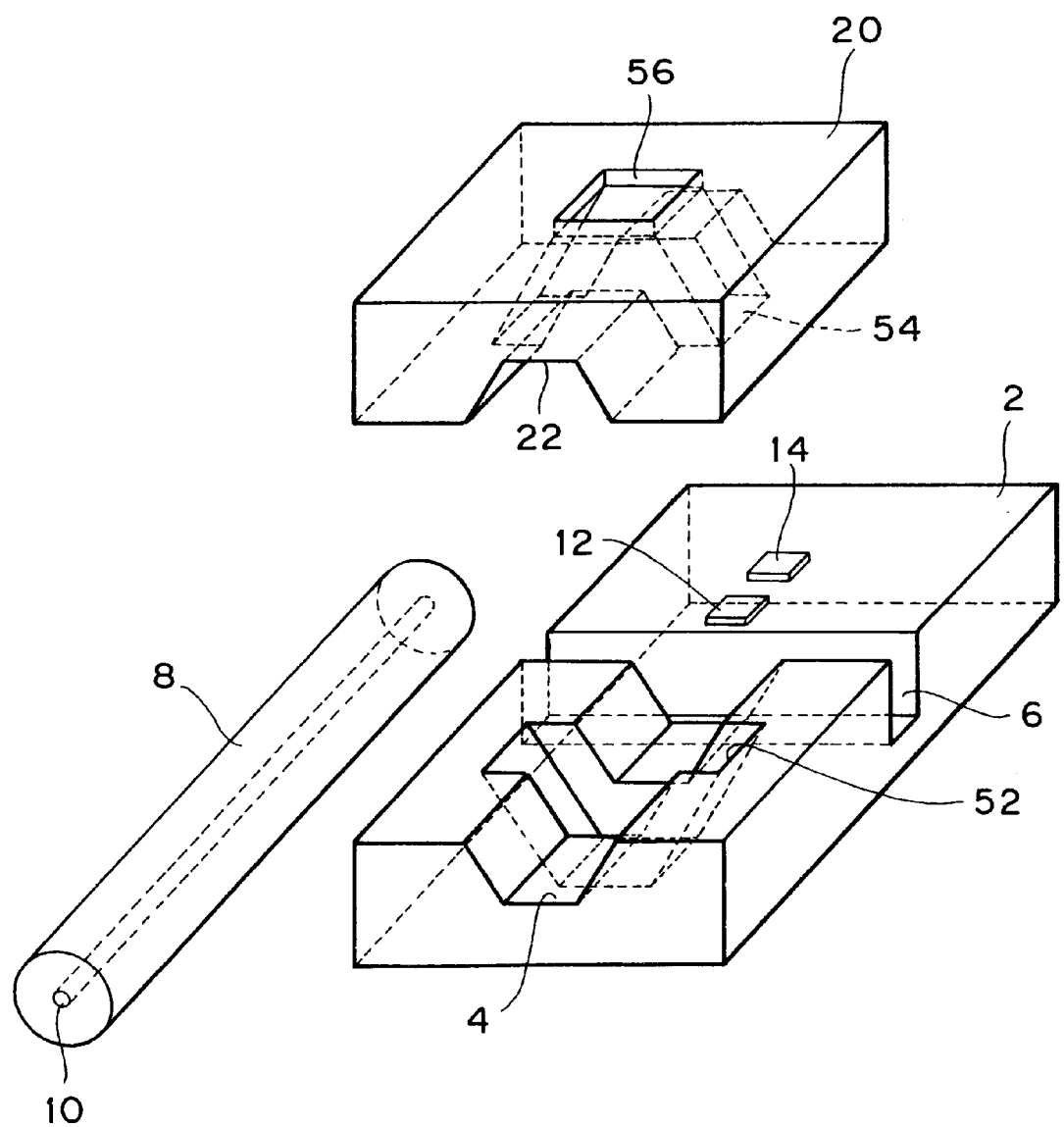
FIG. 8 is an exploded perspective view showing a ferrule fixing structure according to a second preferred embodiment of the present invention.
Figure 9:
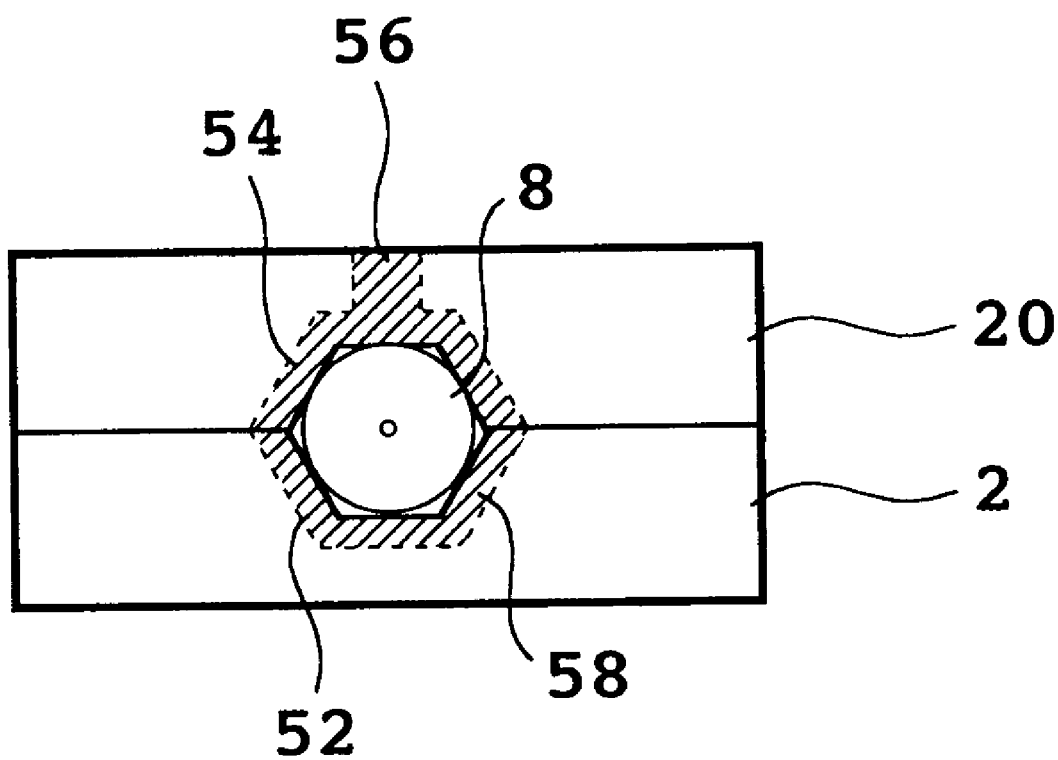
FIG. 9 is an end view of the ferrule fixing structure in the second preferred embodiment.

Referring to FIG. 8, there is shown a ferrule fixing structure according to a second preferred embodiment of the present invention. The substrate 2 is formed with a trapezoidal groove 4 similar to that in the first preferred embodiment, and the substrate 2 is further formed with a trapezoidal recess 52 cut in the trapezoidal groove 4. That is, the trapezoidal groove 52 is deeper and wider than the trapezoidal groove 4. On the other hand, the block 20 is formed with a trapezoidal groove 22 similar to that in the first preferred embodiment, and the block 20 is further formed with a trapezoidal recess 54 cut in the groove 22. That is, the trapezoidal recess 54 is deeper and wider than the trapezoidal groove 22. The recess 52 of the substrate 2 and the recess 54 of the block 20 are mated together to define an adhesive accommodation space around the ferrule 8. The block 20 is further formed with a through hole 56 connecting the upper surface of the block 20 to the recess 54. In fixing the ferrule 8 to the substrate 2, the ferrule 8 is first mounted into the groove 4 of the substrate 2 and positioned therein as similar to the first preferred embodiment. Then, the block 20 is mounted onto the substrate 2 in such a manner that the ferrule 8 is held in the groove 22 of the block 20 as similarly to the first preferred embodiment. In the next step, an adhesive 58 (see FIG. 9) in a liquid state is injected from the through hole 56 into the adhesive accommodation space defined by the recesses 52 and 54. After filling this space with the adhesive 58, the adhesive 58 is cured. In this condition, the ferrule 8 is fully surrounded by the cured adhesive 58 as shown in FIG. 9. With this ferrule fixing structure, the ferrule 8 can be fixed more firmly, and leakage of the adhesive 58 from between the substrate 2 and the block 20 can be prevented, so that an always constant amount of adhesive can be used for fixing of the ferrule 8.

Figure 10A:
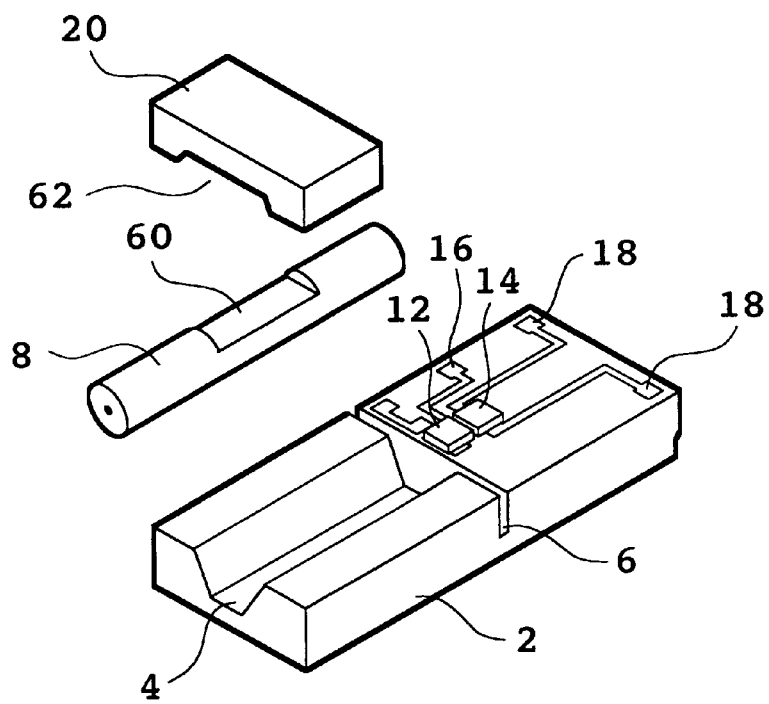
FIG. 10A is an exploded perspective view showing a ferrule fixing structure according to a third preferred embodiment of present invention.
Figure 10B:
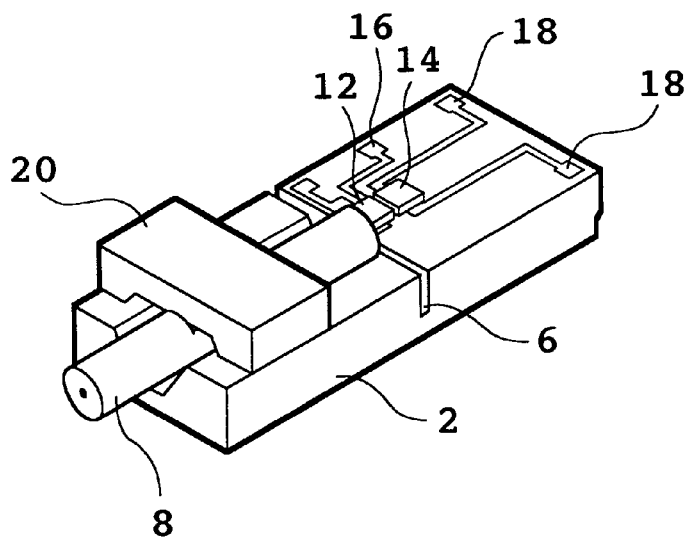
FIG. 10B is a perspective view of the ferrule fixing structure in FIG 10B.

Referring to FIGS. 10A and 10B, there is shown a ferrule fixing structure according to a third preferred embodiment of the present invention. As shown in FIG. 10A, the ferrule 8 is formed with a recess 60, and the block 20 is formed with an engaging portion 62 for engaging the recess 60 of the ferrule 8. As shown in FIG. 10B, the engaging portion 62 of the block 20 is engaged with the recess 60 of the ferrule 8. In this condition, the ferrule 8 is mounted into the groove 4 of the substrate 2 and positioned therein, and the block 20 is fixed to the substrate 2 by an adhesive. By adopting this fixing structure for the ferrule 8, it is possible to ensure higher resistance against an external force applied to the optical module in connecting or disconnecting an optical connector with respect to the optical module.

Figure 11A:
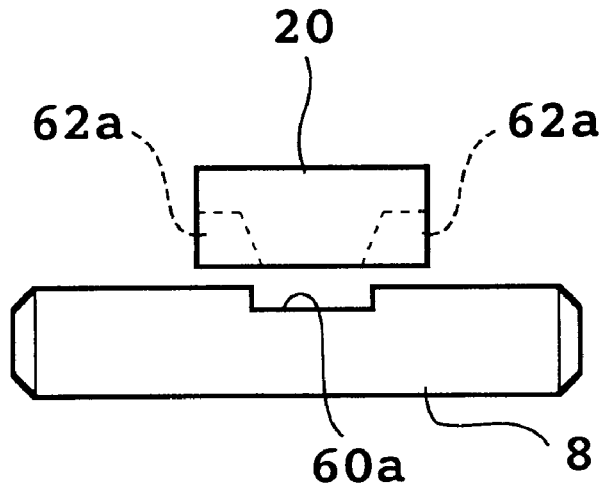
FIGS. 11A, 12A, and 13A are side views showing modifications of a recess formed on a ferrule and an engaging portion formed on a block employed in the third preferred embodiment.
Figure 11B:
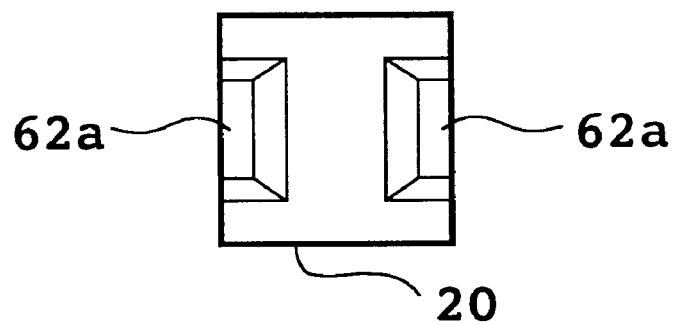
FIGS. 11B, 12B, and 13B are bottom plan views of blocks shown in FIGS. 11A, 12A, and 13A, respectively.
Figure 12A:
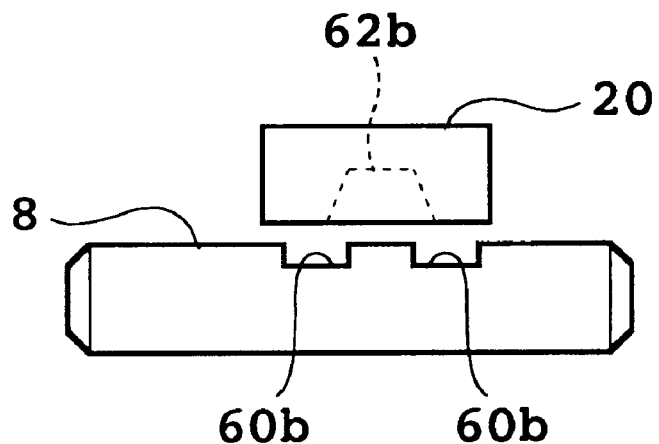
Figure 12B:
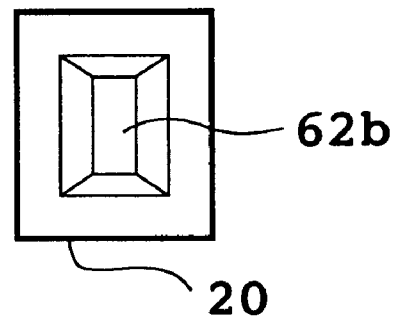
Figure 13A:
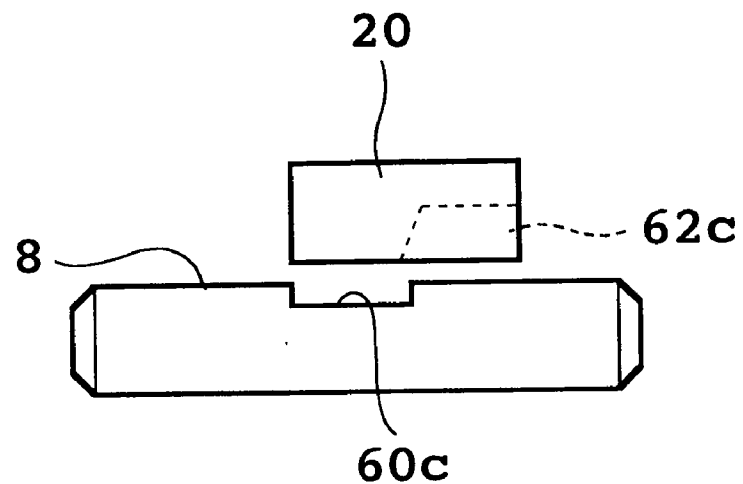
Figure 13B:
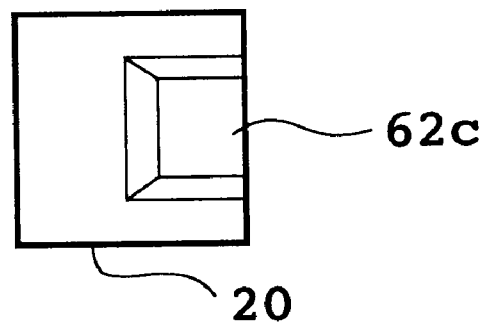

The recess 60 of the ferrule 8 and the engaging portion 62 of the block 20 are merely illustrative. FIGS. 11A to 13B show various modifications of the form of such a recess and an engaging portion. As shown in FIGS. 11A and 11B, a recess 60a and two engaging portions 62a are mated together. As shown in FIGS. 12A and 12B, two recesses 60b and an engaging portion 62b are mated together. As shown in FIGS. 13A and 13B, a recess 60c and an engaging portion 62c are mated together.

Figure 14:
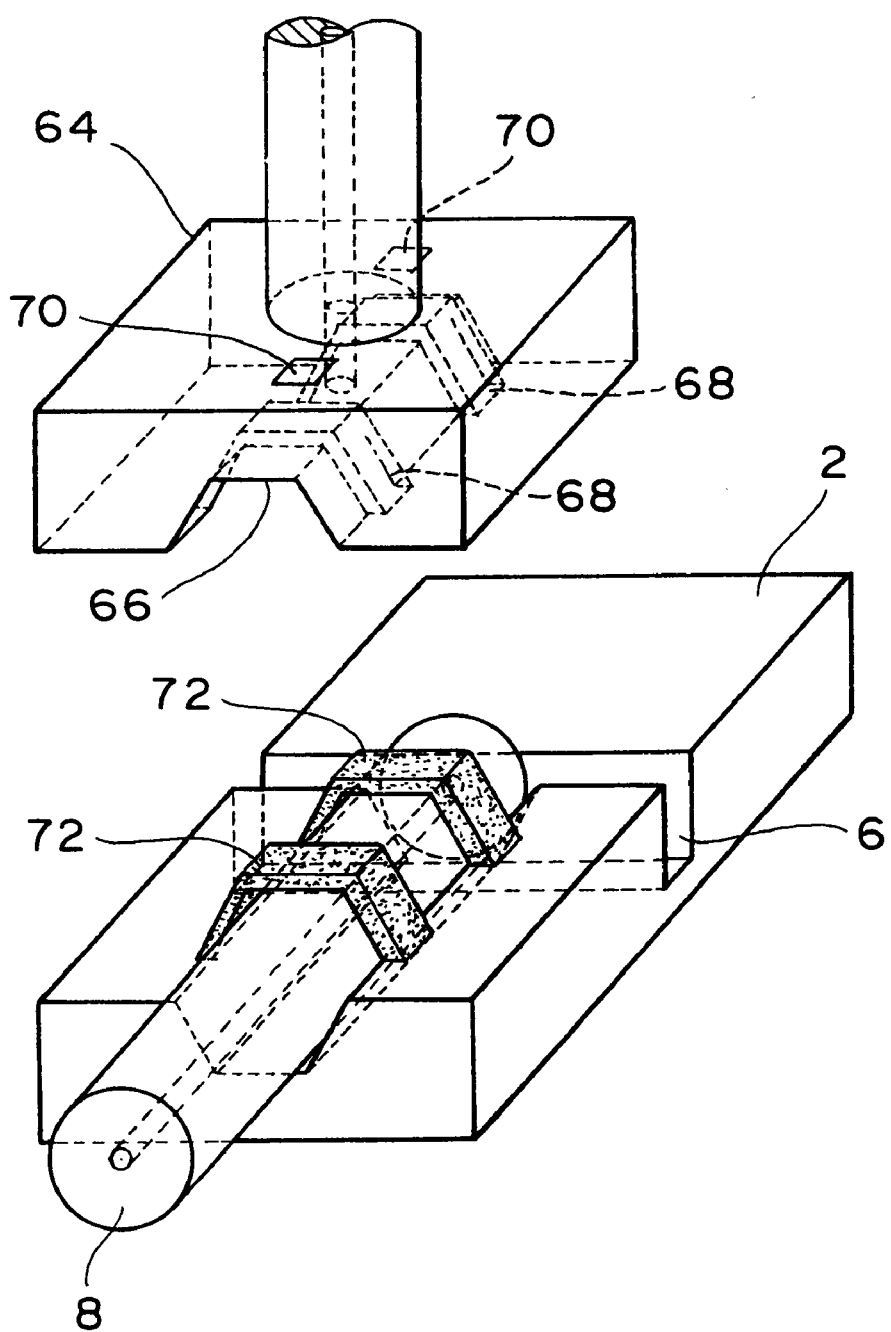
FIG. 14 is an exploded perspective view showing a ferrule fixing structure according to a fourth preferred embodiment of the present invention.

Referring to FIG. 14, there is shown a ferrule fixing structure according to a fourth preferred embodiment of the present invention. In contrast with each of the first to third preferred embodiment wherein the block 20 is pressed by the collet 36 in bonding the block 20 to the substrate 2, this preferred embodiment is characterized in that a collet 64 has such a shape as to function as the block 20 for pressing the ferrule 8. That is, the collet 64 is formed with a trapezoidal groove 66 and a pair of trapezoidal recesses 68 each deeper and wider than the trapezoidal groove 66. The collet 64 is further formed with a pair of through holes 70 connecting the upper surface of the collet 64 to the pair of recesses 68.

In fixing the ferrule 8 to the substrate 2, the ferrule 8 is mounted into the groove 4 of the substrate 2 and positioned therein, and the collet 64 is pressed onto the substrate 2 so that the ferrule 8 is held in the groove 66 of the collet 64. In this condition, a thermosetting resin in a liquid state is injected from the through holes 70 into the recesses 68 closed by the upper surface of the substrate 2. After filling the recesses 68 with the thermosetting resin, the thermosetting resin is cured by heating to become a pair of resin blocks 72. The collet 64 is preferably formed of Teflon, so as to facilitate releasing of the collet 64 from the cured resin blocks 72. Thus, the resin blocks 72 are bonded to the substrate 2 and the ferrule 8 in the above curing step, thereby fixing the ferrule 8 to the substrate 2. With this ferrule fixing structure, the resin blocks 72 serve as blocks for pressing the ferrule 8, so that a cost reduction can be expected.

What is claimed is:

1. An optical module comprising:

a plurality of leads;

a substrate having a first groove and a plurality of conductor patterns electrically connected to said leads;

a ferrule having a center hole in which an optical fiber is inserted and fixed, a first end, and a second end, said ferrule being mounted in said first groove of said substrate so that said first end projects from an end surface of said substrate;

an optical element mounted on said substrate for making conversion between light and electricity;

a first resin for covering at least said optical element and said second end of said ferrule, said first resin having transparency to said light; and a second resin for enclosing all of said leads, said substrate, said ferrule, said optical element, and said first resin except said first end of said ferrule and a part of each of said leads.

2. An optical module according to claim 1, further comprising a block having a second groove, said block being fixed to said substrate so that said second groove holds said ferrule.

3. An optical module according to claim 2, wherein each of said first groove and said second groove has a trapezoidal cross section.

4. An optical module according to claim 2, wherein:

said substrate has a first recess cut in said first groove, said first recess being deeper and wider than said first groove; and said block has second recess cut in said second groove and a through hole connecting an upper surface of said block to said second recess, said second recess being deeper and wider than said second groove;

said first recess of said substrate and said second recess of said block being mated together to define an adhesive accommodation space around said ferrule, whereby said ferrule is fixed to said substrate and said block by an adhesive filled into said adhesive accommodation space from said through hole.

5. An optical module according to claim 1, wherein:

said ferrule has a recess;

said optical module further comprising a block having an engaging portion for engaging said recess of said ferrule, said block being fixed to said substrate in the condition that said engaging portion is engaged with said recess of said ferrule.

6. An optical module according to claim 1, further comprising a third resin cured to fix said ferrule in said first groove of said substrate.

\* \* \* \* \*